Nov. 20, 1951  W. L. TANCRED  2,575,984
GRINDING WHEEL TRUING MECHANISM
Filed Feb. 4, 1946  2 SHEETS—SHEET 1

INVENTOR.
William L. Tancred
BY Wright, Brown, Quinby & May.
ATTYS.

Nov. 20, 1951 W. L. TANCRED 2,575,984
GRINDING WHEEL TRUING MECHANISM
Filed Feb. 4, 1946 2 SHEETS—SHEET 2
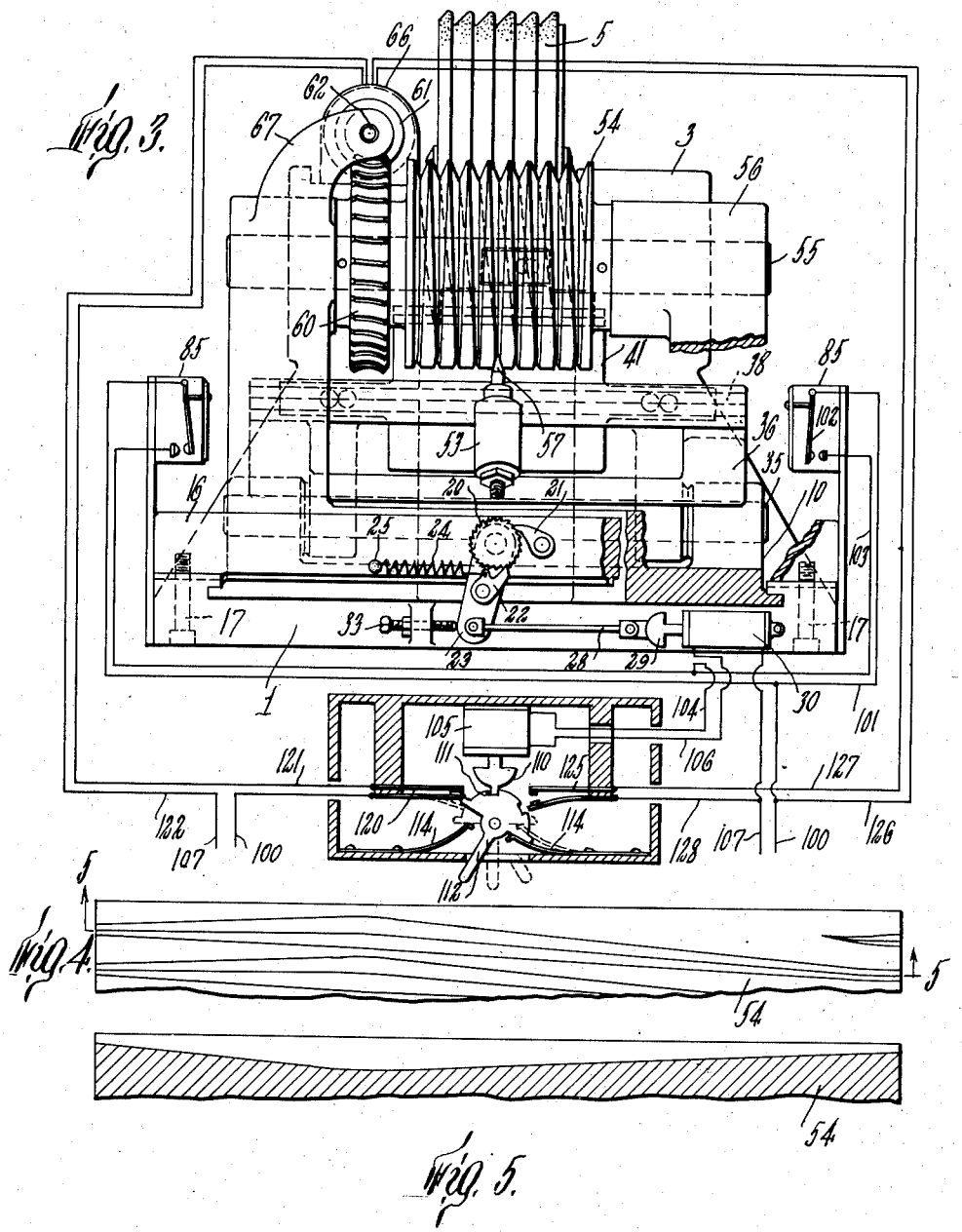
INVENTOR.
BY William L. Tancred Patented Nov. 20, 1951

2,575,984

UNITED STATES PATENT OFFICE 2,575,984

GRINDING WHEEL TRUING MECHANISM

William L. Tancred, Springfield, Vt., assignor to Jones & Lamson Machine Company, Springfield, Vt., a corporation of Vermont Application February 4, 1946, Serial No. 645,293

6 Claims. (Cl. 125—11)

This invention relates to mechanism for truing grinding wheels and more particularly for truing multiple ridged wheels such as are suitable for grinding threaded work, hobs, and the like.

One object of the invention is to provide such a mechanism which requires but one screw cam which controls the contour of the wheel.

A further object is to otherwise simplify the mechanism.

Still another object is to provide means for dressing thread or other forms of any desired contour by the use of a screw cam of the correspondingly proper form.

For a more complete understanding of this invention, reference may be had to the accompanying drawings in which Figure 1 is a top plan view of mechanism embodying the invention.

Figure 3 is a rear elevation of the same.

Figure 4 is a developed peripheral view of the cam.

Figure 5 is a sectional view on line 5—5 of Figure 4.

Figures 1, 2:
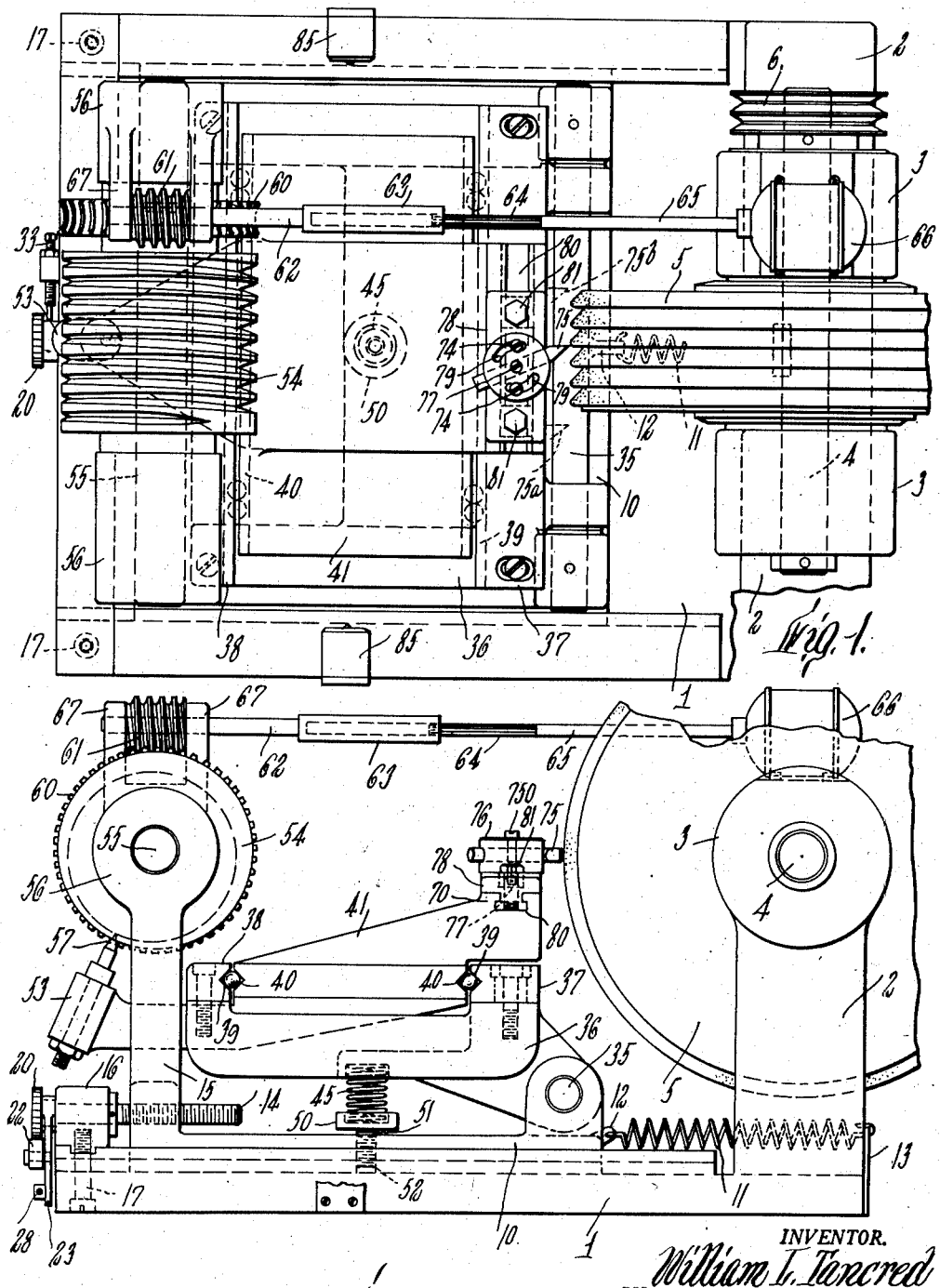
Figure 2 is a side elevation of the same.

Referring to Figures 1, 2 and 3, the mechanism comprises a bed 1 which, if desired, may be a portion of a thread grinding machine. This bed 1 is provided with a pair of upstanding posts 2 spaced apart and having bearings 3 at their upper ends for the journaled reception of a shaft 4 to which the grinding wheel 5 is secured. The shaft 4 may have suitable means for rotating it, a belt pulley 6 being shown for this purpose in Figure 1. This belt pulley may be driven from any suitable drive means such as an electric motor (not shown).

The bed 1 has slidably mounted thereon a support 10, this support being movable transverse to the axis of the shaft 4. It is normally biased toward this axis as by a spring 11, one end of which is engaged with a loop 12 on the support 10, and the other end is engaged with a fixed portion 13 of the bed 1. The limit of such motion is determined by the engagement therewith of a threaded feed screw 14, this being threaded through an upright portion 15 of the support 10. This screw is journaled in a bearing 16 secured to the bed 1 as by one or more screws 17, and is arranged to be turned periodically in feed direction as by ratchet mechanism shown best in Figure 3.

The screw 14 has secured to its outer end, a ratchet wheel 20 against which bears a locking pawl 21 and a dog 22 pivotally carried by a rock arm 23 journaled on the feed screw 14 outwardly of the bearing 16. A spring 24 engaging at one end with a portion of the dog 22 and at its other end with a fixed pin 25 on the bed 1, tends to hold the dog 22 in engagement with the ratchet wheel and the arm 23 at its left hand limit of motion as determined by the adjustable stop screw 33. The holding pawl 21 may engage the wheel by gravity to prevent retracting motion thereof when the arm 23 is rocked in retracting direction. This arm 23 is connected through a link 28 with the core 29 of the solenoid 30. Since the movement of the core 29 inwardly is fixed, adjustment of the limit of back motion of the arm 23 adjusts the amount of turning of the ratchet wheel 20 at each actuation thereof.

The support 10 has pivoted thereto, as on the shaft 35, a track member 36 which has a pair of ways 37 and 38 secured to its upper face, these ways having V grooves 39 therein for the reception of bearing balls 40 which support between them a carriage 41, this carriage being guided between the ways 37 and 38 for motion parallel to the axes of the shaft 4 and of the pivot shaft 35. The angular position of the track member 36 is partly determined by a spring 45 upon which it is supported, this spring resting upon a vertically adjustable abutment or pocket 50. The vertical adjustment may be produced by turning the abutment about its axis so as to determine the extent of threading of a shank portion 51 thereof in a threaded opening 52 in the support 10. This spring also holds a follower or tracer 57 fixed to an arm 53 projecting from the carriage 41 into engagement with a helical cam 54. This cam is carried by a shaft 55 mounted in bearings 56 and arranged parallel to the wheel shaft 4.

The shaft 55 is provided with suitable means for rotating it and as shown this means comprises a worm wheel 60 fixed thereto with which meshes a worm 61 carried by a shaft 62 journaled in bearing arms 67 spaced to permit the worm 61 to be positioned therebetween. The shaft 62 is coupled through an internally splined sleeve 63 with the externally splined portion 64 of a shaft 65, which is driven by a small motor 66 shown as mounted on one of the posts 2. This motor 66 is of the reversing type so that it may rotate the helical cam 54 in either direction. This helical cam has a helical cam face so fashioned as to cause the follower 57 to rock about the axis of the pivot shaft 35 and at the same time to cause the carriage 41 to move parallel to the axes of the grinding wheel and the helical cam, the spring 45 holding the follower 57 in contact with the base of the cam groove.

The carriage 41 has a post portion 70 upon which may be mounted for angular adjustment the truing tool 75 secured by screw 75a. As shown this tool is carried by a disk 76 adjustably about a central pivot 77 and clamped in adjusted position by means of the screws 74 passing through arcuate slots 79 in the disk 76 and threaded into a securing block 78 adjustable along the T shaped way 80 of the carriage 41 and clamped in position as by screws 81. The helical groove in the helical cam is shaped in accordance with the desired contours of the several ribs of the grinding wheel, not only progressing axially but varying in depth, as shown in Figure 5, so that as the cam is rotated, the tool, while traversing lengthwise of the face of the grinding wheel, also moves in and out, to true the grinding wheel to the desired multiple rib contour. As shown, the groove of the helical cam is so formed as to true the wheel in a multiplicity of ridges each shaped to cut a steep faced thread in work ground thereby, though it will be evident that by using a cam having a different groove contour, the grinding wheel may be trued to a corresponding contour in each of its ridges and that this contour may be uniform for each ridge or may be varied from one to another as desired.

Means are provided by which when the truing device has traversed the wheel in one direction, it will be reversed to traverse it in the opposite direction and at the same time it will be fed into the wheel. To this end, at each end of the carriage travel are positioned stop switches indicated at 85 and when either of these stop switches is engaged, it reverses the direction of travel of the helical cam and it may also be caused to actuate the feed solenoid 30 to turn the feed screw 14.

As shown best in Figure 3, the switches 85 are normally open switches, and when closed by impingement thereon of the carriage, a circuit is closed which not only reverses the motor 66, but also energizes the solenoid 30 to produce a feeding impulse. Thus when the right hand switch 85, as viewed in Figure 3, is closed, a circuit is closed from the line 100 through the lead 101, the switch arm 102, leads 103 and 104, locking solenoid 105, lead 106, solenoid 30, back to the line 107. Energization of the solenoid 105 lifts a locking pin 110 from a notch 111 in a control lever 112, which is thereupon moved to its central position by the action of a pair of centering springs 114. This allows the circuit from the line 100 through the switch arms 120 to be broken, thus opening the circuit to the motor 66 through the leads 121, motor 66, leads 122, from the line 107. The energization of the solenoid 30 acts to pull the arm 23 to the right to produce a feed turn to the feed screw 14.

The opening of the switch 120 stops the rotation of the motor 66 and ends the dressing cycle with the truing tool in the dotted line position 75a beyond the width of the grinding wheel where the right hand switch 85 has been closed. When a second cycle is desired, the lever 112 is moved in the opposite direction from its previous position to close the switch at 125 by engagement on one arm thereof of a portion of the lever 112. This energizes the motor 66 in the reverse direction, from the line 100 through lead 126, motor 66, lead 127, switch 125, lead 128 and back to the line 107. This starts the motor 66 in the reverse direction with the carriage moving to the left. When the left hand switch 85 is reached and closed the solenoid 30 and the release solenoid 105 are again energized and the arm 112 is returned to its mid-position.

From the foregoing description of an embodiment of this invention, it should be evident to those skilled in the art that various changes and modifications may be made without departing from its spirit or scope.

I claim:

1. In combination, a base, a work supporting shaft rotatably mounted in the base, a rotatable helical cam mounted on the base and arranged in spaced parallel relation with respect to the work supporting shaft, a support pivotally mounted on the base and arranged between the shaft and the cam, a carriage movably mounted on said support for motion parallel to the axes of the shaft and cam, a follower carried by said carriage and engaging said cam, a tool carried by said carriage in position to operate on a work piece carried by said work supporting shaft, yieldable means holding the support in angular position to maintain the follower against said cam, and means operatively connected to said cam for rotating the same.

2. In combination a base, a work supporting shaft journaled in said base, a helical cam, means supporting said cam for rotation about an axis substantially parallel to the axis of rotation of said shaft, a support pivoted on an axis substantially parallel to said cam axis, a carriage movably mounted on said support for motion parallel to said axis, a follower carried by said carriage and engaging with said cam, a tool carried by said carriage in position to operate on a work piece carried by said work-supporting means, yielding means holding said support in angular position for said follower to engage said cam, means operatively connected to said cam for rotating said cam, and means operatively connected to said support for periodically feeding said support toward the work piece.

3. In combination with a work piece holding means mounted for rotation about an axis, of a support mounted for motion toward and from said work-holding means, a track member pivoted to said support on an axis substantially parallel to said rotational axis, a carriage movably mounted on said track member for motion parallel to said axes, a tool carried by said carriage in position to operate upon work carried by said work-holding means, a helical cam carried by said support for rotation about an axis substantially parallel to the holding means axis, a follower engaging said cam and carried by said carriage, means operatively connected thereto and yieldingly holding said track member in angular position about its axis to press said follower against said cam, and means operatively connected thereto for rotating said cam.

4. In combination with a work piece holding means mounted for rotation about an axis, of a support mounted for motion toward and from said work-holding means, a track member pivoted to said support on an axis substantially parallel to said rotational axis, a carriage movably mounted on said track member for motion parallel to said axes, a tool carried by said carriage in position to operate upon work carried by said work-holding means, a helical cam carried by said support for rotation about an axis substantially parallel to the holding means axis, a follower engaging said cam and carried by said carriage, means operatively connected thereto and yieldingly holding said track member in angular position about its axis to press said follower against said cam, means operatively connected thereto for rotating said cam, and means operatively connected thereto for feeding said support with respect to said work-holding means.

5. In combination with a work piece holding means mounted for rotation about an axis, of a support mounted for motion toward and from said work-holding means, a track member pivoted to said support on an axis substantially parallel to said rotational axis, a carriage movably mounted on said track member for motion parallel to said axes, a tool carried by said carriage in position to operate upon work carried by said work-holding means, a helical cam carried by said support for rotation about an axis substantially parallel to the holding means axis, a follower engaging said cam and carried by said carriage, means operatively connected thereto and yieldingly holding said track member in angular position about its axis to press said follower against said cam, means operatively connected thereto for rotating said cam, and means operatively connected to said rotating means for automatically reversing the direction of rotation of said cam when said carriage reaches predetermined limits of motion on said track member.

6. In combination with a work piece holding means mounted for rotation about an axis, of a support mounted for motion toward and from said work-holding means, a track member pivoted to said support on an axis substantially parallel to said rotational axis, a carriage movably mounted on said track member for motion parallel to said axes, a tool carried by said carriage in position to operate upon work carried by said work-holding means, a helical cam carried by said support for rotation about an axis substantially parallel to the holding means axis, a follower engaging said cam carried by said carriage, means operatively connected thereto yieldingly holding said track member in angular position about its axis to press said follower against said cam, means operatively connected thereto for rotating said cam, means operatively connected thereto for feeding said support with respect to said work-holding means, and means operatively connected to said rotating means for automatically reversing the direction of rotation of said cam when said carriage reaches predetermined limits of motion on said track member and for actuating said feeding means by determined amounts.

WILLIAM L. TANCRED.

REFERENCES CITED

The following references are of record in the file of this patent:

UNITED STATES PATENTS

| Number | Name | Date |
| --- | --- | --- |
| 845,305 | Liebert | Feb. 26, 1907 |
| 1,623,113 | Hanson | Apr. 5, 1927 |
| 1,687,260 | Ross | Oct. 9, 1928 |
| 1,937,961 | Hutchinson | Dec. 5, 1933 |
| 2,228,902 | Allen | Jan. 14, 1941 |

FOREIGN PATENTS

| Number | Country | Date |
| --- | --- | --- |
| 97,882 | Austria | Sept. 25, 1924 |